(No Model.)
J. J. JOHNSTON.
VASE FOR CULTIVATING STRAWBERRIES AND OTHER PLANTS.
No. 253,715. Patented Feb. 14, 1882.
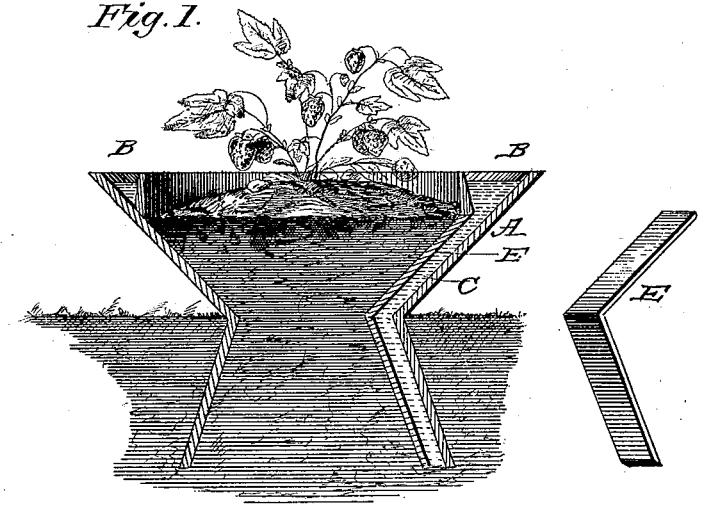
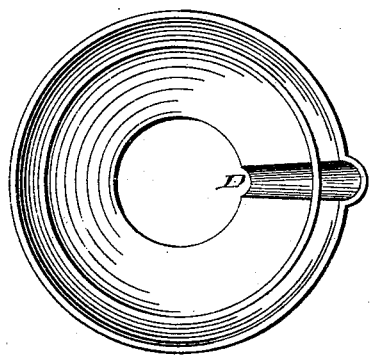
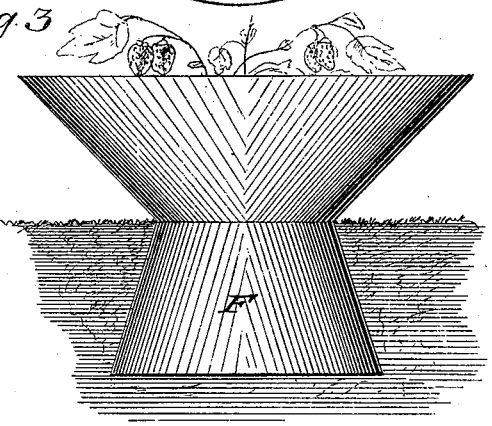
WITNESSES
Fred. G. Dieterich
Jno. W. Stockett
INVENTOR
James J. Johnston

UNITED STATES PATENT OFFICE.

JAMES J. JOHNSTON, OF COLUMBIANA, OHIO.

VASE FOR CULTIVATING STRAWBERRY AND OTHER PLANTS.

SPECIFICATION forming part of Letters Patent No. 253,715, dated February 14, 1882.

Application filed January 12, 1882. (No model.)

*To all whom it may concern:*

Be it known that I, JAMES J. JOHNSTON, of Columbiana, in the county of Columbiana and State of Ohio, have invented a certain new and useful Improvement in Vases for Cultivating Strawberry, Tomato, and other Plants; and I do hereby declare that the following is a full, clear, and exact description thereof, reference being had to the accompanying drawings, and to the letters of reference marked thereon.

My invention relates to an improvement in vases for cultivating strawberry, tomato, and other plants, said vase being of hour-glass contour; the upper portion having a channel around its lip and inner periphery communicating with an angular channel leading to the bottom edge of said vase, as will hereinafter more fully and at large appear.

To enable others skilled in the art with which my invention is most nearly connected to make and use it, I will proceed to describe its construction and operation.

In the accompanying drawings, which form part of my specification, Figure 1 is a vertical section of my improvement in vases for cultivating strawberry, tomato, and other plants. Fig. 2 is a top view or plan of the same. Fig. 3 is a side elevation of the same.

In the accompanying drawings, A represents the vase, which is of hour-glass contour, as shown in Figs. 1 and 2, and is furnished with a channel, B, at its upper and inner edge, which communicates with an angular channel, C, which leads to the bottom edge of the vase, which channel is formed by a recess, D, on the inner side of the vase, and the angular strip E, placed over said recess D, as shown in Fig. 1, which angular strip may be constructed of tin or other sheet metal. In placing the vase in the garden, the part F is sunk below the surface of the ground, as shown in Figs. 1 and 3, the plane of the earth-surface being at the smallest diameter or contraction of the vase. This will hold the vase steady in the earth and will avoid liability to displacement. The channel B, during rains, will catch the water and gradually convey it below the roots of the plants in the vase; and the peculiar form of the vase and the water-channel will serve as a protection against worms and insects.

The advantage of conveying moisture into the vase and down into the earth below the roots of the plants planted in said vase, and the advantage derived from the peculiar form of the vase for holding it steady in the earth and protecting the plant from insects, will be apparent to the skilled gardener without further description.

Having thus described my improvement, what I claim is—

A vase for plants, of hour-glass contour, with open ends and a water-channel, B, communicating with an angular channel, C, for conveying water down into the earth below the roots of the plants, substantially as herein described, and for the purpose set forth.

JAMES J. JOHNSTON.

Witnesses:
A. C. JOHNSTON,
JNO. W. STOCKETT.